INVENTOR
Siegfried Herbert-Erwin Hanchen

ATTORNEYS

United States Patent Office 3,470,793
Patented Oct. 7, 1969

3,470,793
LOCKING DEVICE FOR HYDRAULIC CYLINDER
Siegfried Herbert-Erwin Hanchen, Brunnenwiesenstrasse 3, Ruit uber Esslingen, Germany
Filed Apr. 18, 1966, Ser. No. 543,114
Claims priority, application Germany, Apr. 24, 1965, H 55,861
Int. Cl. F15b *15/26*
U.S. Cl. 92—20     3 Claims

ABSTRACT OF THE DISCLOSURE

A locking device for a hydraulic cylinder, operable to lock the piston in any position by means of interacting male and female cones, the latter expanding to frictionally engage the cylinder walls upon an increase in hydraulic pressure in the system.

---

Figure 1:
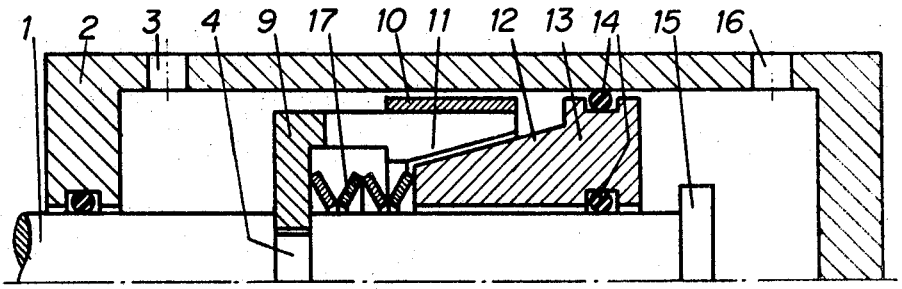

This invention relates to a mechanical locking device for the piston of a double-acting hydraulic or air-operated cylinder.

The mechanical locking means between the piston or piston rod and the cylinder is required to prevent a load lifted by the hydraulic or pneumatic cylinder from undesirably dropping as the result of a leakage or a fracture in the pressurized system associated with the cylinder (viz. flexible and fixed pipes, screwed joints, valves).

It is desirable that the piston should be thus lockable and releasable in any position without the provision of extensive additional structural means and special hydraulic actuating equipment.

Several solutions are already known in the art. However, owing to the relatively high cost of these arrangements their application has been found justifiable only in aircraft where the question of cost is necessarily subordinated to the necessity of absolute safety. On the other hand, cheaper solutions of the problem have not been successful because they were functionally unreliable and were open to more or less substantial objections. For instance, in one such known locking device for special applications provision is made for locking the piston exclusively in its end positions. This is not therefore an arrangement which bears on the contemplated problem of locking the piston in any position. Another known form of construction provides only a specific locking position. The provision in place of a positive locking device of a frictional thrust member acting normally to the piston would generate a one-sided and hence weak and eccentric lateral thrust on the piston which in principle would affect the hydraulic functions of such a piston in an undesirable way. Moreover, a considerable expenditure for valve means would be involved.

In yet another proposal a friction lock associated with means providing a step-up transmission for release is provided. On the one hand, this proposal has the drawback that the friction lock may bite with a screw action into the cylinder wall which is a sealing surface and already exposed to wear by the decrease in stress during the piston stroke. Consequently the seal which always operates in a radial plane cannot maintain uniform seal. On the other hand, a screw device is required for release and this must be pressure tight. In production this cannot be satisfactorily accomplished. Furthermore, a screw device subjected to axial pressure generates considerable friction and this necessitates the generation of correspondingly higher pressures for achieving release.

Finally, another locking means for pistons requires on each side of the piston, several elements which are slidable on the piston rod. This is clearly a somewhat complicated arrangement. The arrangement must be doublesided since one-sided release is impossible. Balls are used which do not provide uniform pressure and local indentation is possible. However, the main objection is that locking does not take place except when the pressure drop is a pressure collapse, i.e. when the admission pipe fractures. In the case of a slow leak the pressure remains constant, as determined by the load, since the latter is supported by the column of oil. Consequently the slidable annular pistons remain tightly contiguous during the operation of lifting as well as when the load is held stationary and no locking takes place. The load can therefore gradually fall should there be a slow escape of pressure fluid.

In all the above locking devices which are intended to operate in any position the lock is activated by spring means, whereas release is effected by an opposing force generated by the pressurized fluid. This principle has the basic drawback that the load can fall in intermediate positions.

In the present invention the above described shortcomings are overcome. The invention resides in that the mechanical locking means for the piston, which is normally released, is activated when the pressure exceeds that determined by the load as such; for example, when the load meets an obstruction, and that in both directions of piston movement the lock remains effective by a self-locking action and cannot be released until the direction of application of the hydraulic pressure is reversed.

This affords the substantial and novel advantage that the mechanical locking force is adjustable by the pressure limiting valve which is always provided in any hydraulic or pneumatic installation, that it is operative in both directions so that it does not depend upon the existing fluid pressure and is therefore maintained irrespective of whether pressure loss is due to slow leak or a sudden escape. It acts evenly around the circumference by virtue of the proposed form of construction, thereby avoiding any impairment by wear of the sliding contact and sealing surfaces. Moreover, no supplementary valve control is required and the arrangement structurally calls for only few in additional means.

The invention will be hereinafter more particularly described by reference to three embodiments shown in the accompanying drawings.

In FIGURE 1 an elastically expanding socket 9 which may be provided with an external friction liner 10 and which forms a female cone 11 is mounted and located on a piston rod 1, for instance in a grove 4. Slidably mounted on the piston rod between the expanding socket 9 and an abutment head 15 at the end of the rod is an annular piston formed with a male cone 12 and provided with seals 14. The annular piston 13 is urged away from the expanding socket 9 by a spring 17. Functionally the spring 17 may be replaced or its effect assisted by the uniform, concentrically acting resilience of the expanding socket 9.

Figure 2:
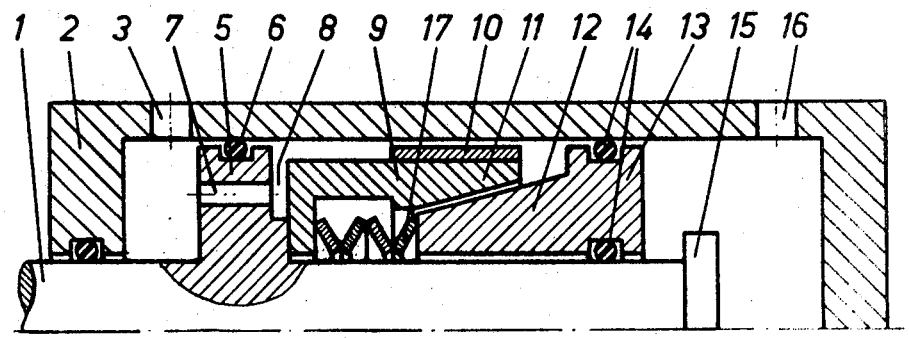

FIGURE 2 differs from the embodiment in FIGURE 1 in that the expanding socket 9 bears against a piston 5 which is fast on the piston rod 1 and which carries a seal 6 for maintaining sliding sealing contact with the bore of the cylinder 2. Moreover, the piston 5 is traversed by a duct 7 through which the operating pressure fluid can be applied to the annular piston 13. The cooperation between member 9 and the duct 7 form a valve at 8.

Figure 3:
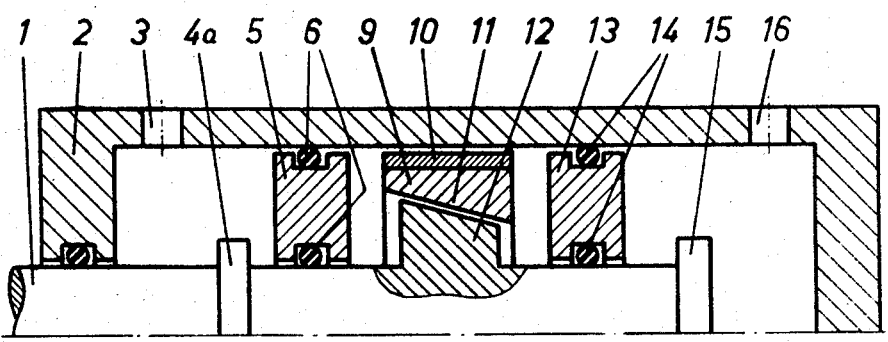

Yet another embodiment is illustrated in FIGURE 3. In this instance the male cone 12 and, in addition to the piston rod head 15, a further abutment 4a are secured to the piston rod. An annular piston 5 and 13 each is axially slidably mounted between the male cone 12 and the abutment 4a on the one hand and the piston rod head 15 on the other hand. Each annular piston 5 and 13 carries a sealing ring 6 and 14 whereas an expanding socket 9 with a female cone is located between the two annular pistons 5 and 13.

The manner in which this locking device functions under the conditions obtaining in the several embodiments will be hereunder described by considering the mathematical relationships which arise.

SYMBOLS USED

Main symbols:
- H—hydraulically generated thrust
- P—spring thrust
- S—locking thrust of expanding socket
- R—frictional force
- V—locking force
- E—releasing force
- L—load
- F—effective surface
- $a$—cone angle
- $p$—hydraulic pressure
- $\mu$—coefficient of friction Indices:
- T—dish spring
- K—piston
- S—piston rod
- D—differential annular piston
- B—expanding socket
- Z—cone
- $a$—acting axially
- $r$—acting radially
- $v$—for locking
- $l$—for releasing When the piston rod 1 is extended supporting a load, the pressure fluid is applied to the piston rod and to the annual piston 13. The annular piston 13 compresses the dish spring 17 and/or expands the socket 9, but not sufficiently to bring the friction liner 10 into engagement with the cylinder wall.

Hence $$L < H_S + H_D = p \cdot (F_D + F_S) \quad (1)$$

Meanwhile, according to the invention, the following condition applies:

$$P_{Ta} + P_{Br} \cdot \tan a + R_{Za} > H_D = F_D \cdot p \quad (2)$$

i.e. the power of the springs 17, the axial component of thrust of the expanding socket and the frictional force of the cone 12 must exceed the force acting on the annular piston.

If the load L, for instance due to external resistance, rises sufficiently to reverse the relationship (1), then $p$ will rise to $p_v$ and the inequality (2) according to the invention is likewise reverse to lock the system mechanically by expansion of the cone 11.

Assuming that the cone angle and the coefficient of friction are suitably chosen 11 and 12 will frictionally interlock, i.e.

$$R_{Za} > P_{Ta} + P_{Br} \cdot \tan a \quad (3)$$

Consequently the force operating to lock the servo cylinder in both directions of action when $p:0$ on both sides of the annular piston will be $$V_a = S_{Br} \cdot F_B \cdot \mu \quad (4)$$

where $$S_{Br} = (H_D - P_{Ta} - R_{Za}) \cdot \cot a - P_{Br} \quad (5)$$

In order to simplify the design $P_T$ may be 0, $P_B$ being chosen to be sufficiently high for satisfying the condition (2) required by the invention. On the other hand, in order to increase the locking force $V_a$ or to reduce the difference $p_v - p$, the power of the dish spring $P_T$ may be chosen that after reversal of the relationship (2) the spring rate falls or becomes zero or even negative (tilting action) and $P_{Br}$ very small. The Equation 5 may be approximated by the equation $$S_{Br} = (H_D - R_{Za} \cdot \cot a \quad (6)$$

where $$H_D = F_D \cdot (p_v - p) \quad (7)$$

By substitution of (6) and (7) in (4) the fundamental condition for performing the invention becomes $$V_a = [F_D \cdot (p_v - p) - R_{Za}] \cdot \cot a \cdot F_B a \mu \quad (8)$$

in conjunction with the requirement expressed by the inequality (3).

Release of the lock proceeds correspondingly, the signs being reverse, when $p_1$ is applied to the annular piston 13 via admission 3 and $$H_D = p_1 \cdot F_D > R_{Za} - P_{Ta} - P_{Br} \cdot \tan a \quad (9)$$

In order to make $p = p_v$, so that the lock will operate even when the external load does not meet resistance, conventional means may be provided, according to the invention, to block the column of oil at 3 and to control the oil duct 7 in piston 5 by control means to close the duct for locking and to open the same for release.

Having thus described my invention what I claim is:
1. A fluid cylinder comprising:
   (a) an inner cylinder wall,
   (b) a piston means engaging said cylinder wall,
   (c) a piston rod slidably mounted within said cylinder and being movable with respect to said piston means,
   (d) an abutment fixedly attached to said piston rod,
   (e) a locking device for said piston means including:
      (1) a male member forming part of said piston means,
      (2) a female member positioned between said male member and said cylinder wall and abutting said abutment,
      (3) said female member being radially shiftable by said male member,
      (4) said female member having a friction liner operatively abutting said inner cylinder wall.
2. A fluid cylinder as set forth in claim 1 wherein said abutment is a second piston means.
3. A fluid cylinder as set forth in claim 2 further including an oil duct traversing said second piston means.

References Cited

UNITED STATES PATENTS

| | | | |
|---|---|---|---|
| 435,139 | 8/1890 | Frolich | 92—28 X |
| 1,578,997 | 3/1926 | Hulshizer | 92—28 |
| 2,259,815 | 10/1941 | Greve | 92—28 X |
| 2,515,712 | 7/1950 | Horton et al. | 92—28 X |
| 2,845,902 | 8/1958 | Anderson | 92—28 X |
| 2,876,746 | 3/1959 | Storrs | 92—28 |
| 3,161,400 | 12/1964 | Floyd | 92—24 X |
| 3,272,087 | 9/1966 | Culver. | |
| 3,353,455 | 11/1967 | Berry | 92—24 |

MARTIN P. SCHWADRON, Primary Examiner

I. C. COHEN, Assistant Examiner

U.S. Cl. X.R.

92—24, 28